United States Patent [19]
Karpenko

[11] 3,765,456
[45] Oct. 16, 1973

[54] CHEMICAL CLEANING LINE CONNECTOR

[75] Inventor: Anatole N. Karpenko, San Francisco, Calif.

[73] Assignee: Anchor Equipment Company dba Anchor Valve Company, Hayward, Calif.

[22] Filed: Apr. 17, 1972

[21] Appl. No.: 244,643

[52] U.S. Cl. .................................. 138/89, 285/177
[51] Int. Cl. ............................................. F16l 55/10
[58] Field of Search ............... 138/89, 92; 285/177; 220/46 MS, 3; 52/221

[56] References Cited
UNITED STATES PATENTS

| 3,695,482 | 10/1972 | Smith | 220/46 MS |
| 2,932,321 | 4/1960 | Mercier | 285/321 |
| 2,781,942 | 2/1957 | Eastburg | 285/321 |
| 3,370,870 | 2/1968 | Mahoff | 285/321 |
| 2,903,152 | 9/1959 | Kuo | 292/251 |

Primary Examiner—Jordan Franklin
Assistant Examiner—Conrad L. Berman
Attorney—Eckhoff, Hoppe, Slick, Mitchell and Anderson

[57] ABSTRACT

This invention relates to a closure structure provided upon an end of a tube as in a boiler or the like as in one heated by a fossil or atomic fuel. The closure can be removed readily and a line connected to the boiler tube so that a chemical solution can be passed through the series of boiler tubes to flush them.

3 Claims, 2 Drawing Figures

CHEMICAL CLEANING LINE CONNECTOR

BACKGROUND OF THE INVENTION

In the past, when it was desired to wash out the tubes in a boiler, it was necessary to cut off the end of one of the tubes with a cutting torch, weld a fluid connection in place, conduct the flushing operation, and then reverse the cutting and welding operations to close the tube.

SUMMARY OF THE INVENTION

It is in general the broad object of the present invention to provide a simple, mechanical, chemical cleaning line connection which is effective in providing a closure for a boiler heated by fossil or atomic fuel which boiler may operate for example at 1,100 pounds per square inch at 560° F. In accordance with this invention, a tube closure is readily removed and is replaced with a fitting enabling a connection to be made to a source of chemical to be used to flush out the boiler tubes under a pressure say of 300 pounds per square inch at 200° F. After the flushing operation, the fitting is replaced with the tube closure by simple mechanical steps whereupon the boiler is ready for operation.

DESCRIPTION OF THE PREFERRED EMBODIMENT

Figure 1:
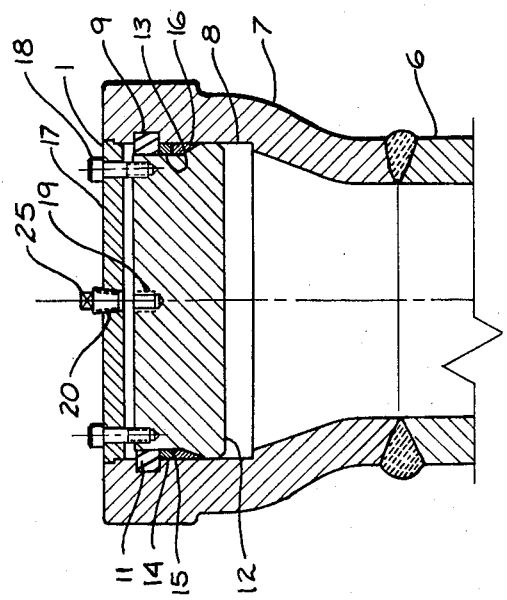
FIG. 1 is a side elevation in section showing the end closure of one of the tubes of the boiler.

In accordance with the present invention, one or more of the tubes 6 in the boiler is provided with a bell-shaped end 7 having an annular recess 8 of uniform diameter at one end of the tube. Intermediate the ends of the annular recess, an annular channel 9 is provided for reception of several segments of a metallic ring structure 11. A plug 12 fits in the annular recess 8, the lower end of the plug fitting against the annular recess while the upper end of the plug is relieved as at 13 to receive a spacer ring 14 and a gasket 16. In use, the pressure in the tube 6 will force the plug against the segmented metallic ring 11 so that the spacer ring 14 and gasket 16 bear against the ring and so maintain the plug in sealing position. The area 15 below the segmented metallic ring and against which the spacer and gasket radially bear is preferably faced with a hard metal facing such as McKay HARDALLOY No. 120 for corrosion protection.

A cover plate 17 is fitted over the end of the plug in the annular recess 8 and is held in position by several fastening means or studs 18 which draw the plug into sealing position. The plug 12 is threaded centrally as at 19 to receive a pull rod for removal of the plug when access to the boiler tubes is desired. The cover plate 17 has a threaded opening 20 therein closed by plug 25 to permit the pull rod to be admitted and engaged with the plug.

With the plug 12 removed from position in FIG. 1, it is a simple matter to insert a second plug 21 in the annular recess 8 and to have this in turn to bear against the segmented metallic rings 22. The second plug 21 is annular and fits the annular recess 8 closely being assisted in its closing of the recess by O-ring 30. The plug 21 is maintained in position by the annular cover 23 and studs 24. The annular plug 21 carries a conduit 26 which is attached to flange 27 which can be attached in turn to a valve and then to a conduit leading to the chemical cleaning line for admission of the flushing fluid.

Figure 2:
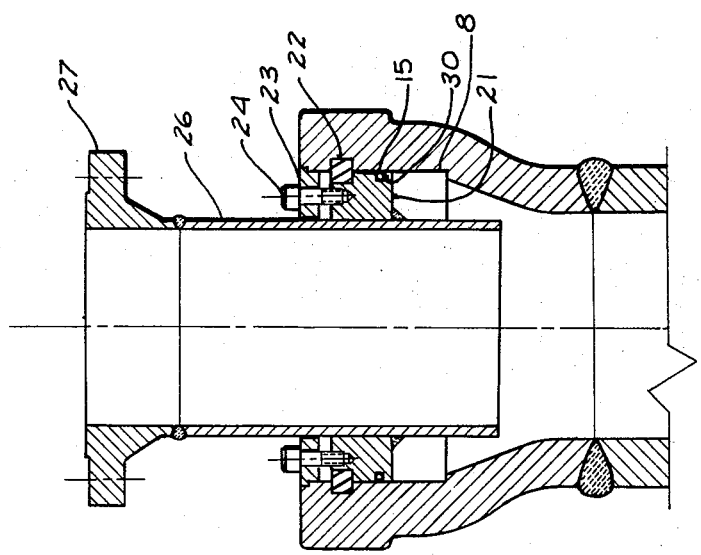
FIG. 2 is a side elevation similar to FIG. 1 but with the closure element shown in FIG. 1 removed and with the fluid line connector in position for attachment to a fluid line for flushing of the boiler tubes.

When the cleaning operation has been completed, it is merely necessary to remove the structure, shown in FIG. 2, and replace it with the plug shown in FIG. 1 whereupon the boiler can be placed in operation at the normal temperature and pressure.

From the foregoing, it will be apparent that I have provided a novel and simple and improved means for connecting a chemical line to a boiler so that the tubes can be flushed as desired.

I claim:

1. A closure for a boiler tube having an annular, diametrically enlarged inner wall defining an annular recess of uniform diameter at one end of the tube, an annular channel in the wall of the recess adjacent to but spaced from the end of the tube, a circular disc-shaped plug fitted in the recess and having a substantially flat inner end and a single, substantially flat outer end, the inner end of the plug greater in diameter than the outer end thereof and having a circumferential outer surface engaged with the wall of the recess axially inwardly of the channel, the outer end of the plug having a substantially constant diameter circumferential outer surface spaced radially inwardly from the wall of the recess and extending from the increased diameter inner end to the flat outer end, a segmented metallic ring in said channel and fitting snugly against the circumferential outer surface of the plug at the outer end thereof to hold the plug in place, a sealing gasket engaged between the outer surface of the plug and the wall of the recess between the metallic ring and the enlarged inner end of the plug to seal the plug relative to said tube, the wall of the recess at least in the area engaged by the sealing gasket having a metal facing of greater hardness than the remainder of the recess, a single cover plate secured over said end of the tube outwardly of said plug, fastening means extended through said cover plate and threaded into the flat outer end of said plug to draw said plug and cover plate toward one another to urge said plug into sealing position, an opening through the center of the cover plate, a removable closure in said opening, and a threaded recess in the flat outer end of said plug in alignment with the opening through said cover plate to enable a tool to be engaged with said plug to remove said plug from said tube.

2. A closure as in claim 1, wherein a tapered, annular, outwardly facing shoulder is on the outer surface of the plug between the inner and outer ends thereof, said sealing gasket having a tapered surface shaped complementary to the tapered shoulder and engaged with the shoulder.

3. A closure as in claim 2, wherein a spacer ring is engaged between the sealing gasket and the segmented ring, said spacer ring having a rectangular transverse cross-section.

* * * * *